US 6,534,115 B2

(12) United States Patent
Gallagher et al.

(10) Patent No.: US 6,534,115 B2
(45) Date of Patent: Mar. 18, 2003

(54) CONTROL PROCESS FOR IMPREGNATING POROUS PARTS AND APPARATUS THEREFOR

(75) Inventors: Emerson Richard Gallagher, Vancouver (CA); Paul Po Hang Fong, Vancouver (CA); Oliver Clemens, Vancouver (CA); Horst Thumm, Filderstadt (DE); David Brown, Surrey (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/896,173

(22) Filed: Jun. 29, 2001

(65) Prior Publication Data

US 2002/0015779 A1 Feb. 7, 2002

Related U.S. Application Data

(63) Continuation-in-part of application No. 09/618,678, filed on Jul. 19, 2000, now abandoned.
(60) Provisional application No. 60/288,328, filed on May 3, 2001.

(51) Int. Cl.[7] .............................. B05D 1/18; B05D 3/02
(52) U.S. Cl. .................. 427/8; 427/430.1; 427/294; 427/372.2; 427/385.5
(58) Field of Search ................... 427/8, 430.1, 294, 427/372.2, 385.5

(56) References Cited

U.S. PATENT DOCUMENTS

| | | | |
|---|---|---|---|
| 3,948,213 A | 4/1976 | Hoyer et al. | |
| 3,959,520 A | 5/1976 | Hoyer et al. | |
| 4,183,963 A | 1/1980 | Brimelow et al. | 426/321 |
| 4,287,138 A | * 9/1981 | Buckner | 261/115 |
| 4,311,735 A | 1/1982 | Young | 427/295 |
| 4,384,014 A | 5/1983 | Young | 427/294 |
| 4,873,102 A | 10/1989 | Chang et al. | 427/130 |
| 5,019,426 A | 5/1991 | Noe et al. | 427/314 |

(List continued on next page.)

FOREIGN PATENT DOCUMENTS

JP            60065781 A   *  4/1985   ........... C04B/35/52

OTHER PUBLICATIONS

D. Muscat et al.: "Modeling the Infiltration Kinetics of Molten Aluminum Into Porous Titanium Carbide" *Metallurgical and Materials Transactions A* (Physical Metallurgy and Materials Science), Nov. 1994, vol. 25A, No. 11, pp. 2357–2370, XP–002190295.

D. Muscat et al.: "A Method of Measuring Metal Infiltration Rates in Porous Preforms At High Temperature" *Journal of Materials Science Letters* Oct. 15, 1993, vol. 12, No. 20, pp. 1567–1569, XP–002190296.

H. Yamada, et al.: "Observation and analysis of the infiltration of polymer liquids into carbon black agglomerates" *Chemical Engineering Science*, Jun. 1998, vol. 53, No. 11, pp. 1963–1972, XP–002190297.

(List continued on next page.)

*Primary Examiner*—Michael Barr
(74) *Attorney, Agent, or Firm*—McAndrews, Held & Malloy, Ltd.

(57) ABSTRACT

A process for impregnating at least one porous part with an impregnant is provided comprising: (a) immersing the porous part(s) in impregnant; (b) measuring at least one parameter indicative of the buoyancy of the porous part(s) as the impregnant impregnates the parts; and (c) interrupting impregnation when the measured parameter(s) indicates a predetermined level of impregnation is achieved. An apparatus for impregnating porous parts comprises a vessel for holding the porous part(s) and an impregnant, and a measuring device for measuring at least one parameter indicative of the buoyancy of the porous part(s) immersed in the impregnant within the vessel.

33 Claims, 3 Drawing Sheets

U.S. PATENT DOCUMENTS

| | | | | |
|---|---|---|---|---|
| 5,348,774 | A | | 9/1994 | Golecki et al. .............. 427/543 |
| 5,776,372 | A | | 7/1998 | Saito et al. ................. 252/511 |
| 5,976,727 | A | * | 11/1999 | Mercuri et al. ............... 429/37 |
| 5,985,114 | A | | 11/1999 | Sekhar et al. ............... 204/290 |
| 5,993,892 | A | | 11/1999 | Wasserman et al. ........... 427/8 |
| 6,348,279 | B1 | * | 2/2002 | Saito et al. ................... 429/34 |

OTHER PUBLICATIONS

Database WPI, Section Ch, Week 198521, Derwent Publications Ltd., AN 1985–126611, XP002190298 & JP 60 065781 A (Hitachi Chem Co Ltd), Apr. 15, 1985, abstract.

* cited by examiner

CONTROL PROCESS FOR IMPREGNATING POROUS PARTS AND APPARATUS THEREFOR

CROSS-REFERENCE TO RELATED APPLICATION(S)

This application is a continuation-in-part of U.S. patent application Ser. No. 09/618,678 filed Jul. 19, 2000 now abandoned, which is incorporated herein by reference in its entirety. This application is also related to and claims priority benefits from U.S. Provisional Patent Application Serial No. 60/288,328 filed May 3, 2001.

FIELD OF THE INVENTION

The present process and apparatus relate to processes for the impregnation of porous parts. In particular, the present process and apparatus provide for control of the extent of impregnation by measuring the change in buoyancy of the parts during the impregnation process.

BACKGROUND OF THE INVENTION

Impregnation of porous parts is a common technique employed in a variety of industries for a variety of reasons. Stone, brick, ceramic, wood, polymer, aggregate, cermet, and porous metal parts, for example, are commonly impregnated. Typically, a sealant is impregnated into the part because the porosity is undesirable in the intended end use of the part. In some applications, it is only necessary to seal the pores on the surface of the part. In other applications, thorough impregnation of the part is necessary. Further, in certain applications it may be possible to over-impregnate a part, so careful control of the level of impregnation is required.

By way of example, fuel cells, including solid polymer electrolyte fuel cells, utilize initially porous components such as separator plates. Separator plates are commonly made from graphite, graphitized carbon or carbon-resin composites.

Separator plates are typically thoroughly impregnated with an impregnant that assists in imparting necessary impermeability and mechanical stability (that is, structural strength and hardness). In other words, once impregnated, separator plates are substantially impermeable to the fluid reactants and/or coolants used in the fuel cell or fuel cell stack, mechanically stable and electrically conductive. Known impregnants suitable for such purposes include phenols, epoxies, melamines, furans, and acrylics, such as methacrylates, for example.

For example, expanded graphite sheets, such as the material available from UCAR Carbon Technology Corp. (Danbury, Conn., U.S.A.) under the tradename GRAFOIL, may be used to form separator plates for fuel cells. Expanded graphite sheets are useful in this regard because they are relatively light, flexible and amenable to low-cost manufacturing methods, such as embossing. Nonetheless, separator plates made from expanded graphite sheets are typically impregnated in order to achieve the desired levels of impermeability and mechanical stability.

It is important that such plates be sufficiently impregnated to meet performance requirements. At the same time, it is possible to over-impregnate the plates, resulting in degradation or loss of desired structural and/or functional properties.

In addition, it is generally undesirable to have residual cured impregnant left on the surface of the impregnated plates. The presence of impregnant deposits on the surface of the cured plate can: affect the electrical conductivity of the plate; interfere with electrical contact between fuel cell components in the assembled cell/stack; be detrimental insofar as thickness tolerances are concerned; and, may also interfere with the function of surface features on the plate. Accordingly, impregnation process control is an important aspect of separator plate manufacture.

In typical industrial processes, curing of the impregnated parts is accomplished by dipping the parts in a hot water bath after washing and rinsing. Often, the washing, rinsing and curing steps can occur in the same vessel.

Conventional impregnation process control methods typically rely on a consistent time required to sufficiently impregnate a part. Based on such methods, an optimum time can be selected to ensure adequate impregnation without much wasted time or expenditure. However, where relatively subtle process and/or material changes can drastically affect the proper impregnation time necessary to achieve the desired impregnation level, such methods are unsatisfactory. For example, the variability of different grades, lots and batches of expanded graphite sheet, as well as variations in separator plate processing or design, has made it virtually impossible to determine an appropriate impregnation time beforehand for a given lot of separator plates.

Current methods use the impregnation time from the previous batch of plates as the initial time estimate for impregnation of the next batch, taking into account other factors such as plate thickness, density, etc. Since the level of impregnation can only be assessed after the impregnation process is complete, entire batches of parts may have to be scrapped due to incorrect estimates of the impregnation time. This approach is costly in terms of time and materials, and is poorly suited to high-volume production methods.

SUMMARY OF THE INVENTION

In one embodiment, the present process comprises:
(a) immersing at least one porous part in an impregnant;
(b) measuring at least one parameter indicative of the buoyancy of the part(s) as the impregnant impregnates the part(s); and
(c) interrupting impregnation when the measured parameter(s) indicates a predetermined level of impregnation is achieved.

The measured parameter may comprise the change in weight of the part(s), the rate of change in weight of the part(s), or both. Preferably, the measured parameter(s) is (are) measured continuously. Impregnation may be interrupted when the change in weight exceeds a predetermined threshold value, when the rate of change in weight falls below a predetermined threshold value, or both. The measured parameter(s) may be compared to a reference parameter value and impregnation may be interrupted when the measured parameter(s) varies from the reference parameter value(s) by less than a predetermined threshold amount. For example, impregnation may be interrupted when the measured parameter indicates that at least 85% of the void volume of the porous part(s) is impregnated, or alternatively, when the measured parameter indicates that at least 95% of the void volume of the porous part(s) is impregnated.

The process may further comprise sending an output signal representative of the measured parameter(s) to a controller, which may comprise a display for displaying the measured parameter(s) represented by the output signal(s). Impregnation may be interrupted in response to an output signal from the controller.

The porous part may comprise a carbon plate, including but not limited to a graphite plate. For example, the porous part may comprise an expanded graphite plate.

The impregnant may be any suitable impregnant. Where graphite plates are impregnated, particularly suitable impregnants include resins such as phenols, epoxies, melamines, furans and acrylics such as methacrylates, for example.

The porous part(s) may be impregnated at any suitable pressure. For example, the porous part(s) may be impregnated at ambient pressure, at a pressure less than atmospheric pressure, at a pressure greater than atmospheric pressure, or a combination thereof.

Where a plurality of porous parts is impregnated according to the present method and apparatus, the measured parameter may be indicative of the level of impregnation of all of the porous parts or only a portion thereof. For example, the measured parameter may comprise the change in weight, rate of change in weight, or both, of all of the porous parts being impregnated. Alternatively, the measured parameter may comprise the change in weight, rate of change in weight, or both, of a representative sample of the porous parts being impregnated.

The present process may further comprise heating the porous part(s) before immersion into the impregnant.

The present process may also further comprise washing, rinsing and drying the impregnated part(s) to remove at least a portion of residual water that may be present on the surfaces thereof.

In another embodiment, the present process comprises preparing an impregnated porous part for curing by washing and rinsing the impregnated porous part, and drying the impregnated part at a drying temperature to remove at least a portion of the residual water from the surfaces of the part.

An apparatus for impregnating porous parts is also provided comprising a vessel for holding at least one porous part and an impregnant, and at least one measuring device for measuring the change in weight of the part(s) immersed in the impregnant within the vessel. The apparatus may further comprise a pump fluidly connected to the vessel for varying the pressure therein from ambient pressure.

The measuring device(s) may comprise an electronic balance having a cantilever arm connected at one end to the balance, the other end of the arm being suspended in the vessel. The suspended end being removably attachable to the porous part(s) for measuring the change in weight thereof. Alternatively, the measuring device(s) may comprise a load cell associated with the interior of the vessel. Preferably, the at least one measuring device generates output signals representative of the measured parameter(s). The apparatus may further comprise a controller for receiving the output signals from the measuring device(s), and the controller may comprise a display for displaying the change in weight represented by the output signals.

DETAILED DESCRIPTION OF PREFERRED EMBODIMENT(S)

In typical industrial processes, porous parts, usually metal castings, are impregnated with a suitable sealant by immersing them in an impregnant for a predetermined length of time. Curing of the impregnated parts is typically accomplished by dipping the parts in a hot water bath after washing and rinsing. Often, the washing, rinsing and curing steps can occur in the same vessel. Regardless of the method of curing employed, curing temperatures are generally between about 70° C. and about 90° C., although suitable temperatures depend on the impregnant employed.

In one aspect, the present process and apparatus allow for control of the level of impregnation of porous parts by measuring the change in buoyancy of the parts during the impregnation process. The present process and apparatus may be applicable to the impregnation of porous parts generally by an impregnant. Such porous parts may include, for example, stone, brick, ceramic, wood, polymer, aggregate, cermet, and porous metal parts, as well as parts comprising porous carbon. Any suitable liquid impregnant may also be employed, depending upon the application. The present process and apparatus are particularly applicable to impregnation of porous parts where batch-to-batch variability makes impregnation processes based on a constant, predictable impregnation time unsuitable, or where a target level of impregnation is required for performance or cost effectiveness.

When dry porous parts are placed in a liquid impregnant, they are comprised of solids of a known density and empty voids. As such, they have an initial buoyancy in the impregnant. As the voids are filled with impregnant, the effective mass of the parts increases while the effective volume remains constant. Thus, as impregnant fills the voids the buoyancy of the parts decreases and their apparent weight in the impregnant increases. By measuring the magnitude of this weight change, the rate of change, or both, it may be possible to determine the level of impregnation of the part. When the change in buoyancy and/or the rate of change in buoyancy indicates the desired level of impregnation has been achieved, the part may be removed from the impregnant, or the impregnation process otherwise interrupted.

Figure 1:
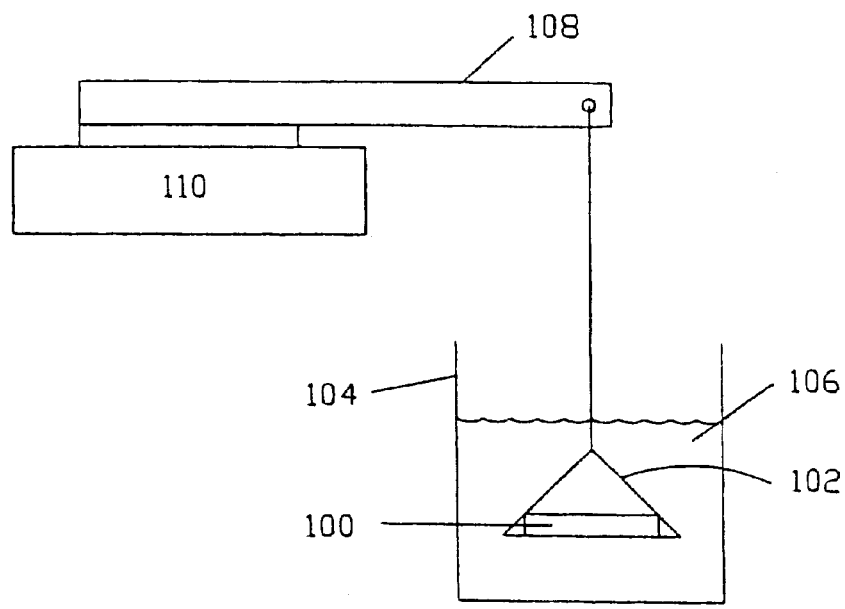
FIG. 1 is a schematic illustration of an embodiment of the present apparatus.

FIG. 1 is a schematic illustration of an embodiment of the present apparatus. Porous part 100 is supported by frame 102. Frame 102 is suspended in vessel 104 filled with liquid impregnant 106. Frame 102 is attached to one end of cantilever arm 108. The other end of cantilever arm 108 is movably attached to electronic balance 110. In an embodiment of the present method, porous part 100 and frame 102 are suspended from cantilever arm 108 and immersed in impregnant 106. At this point (time zero) porous part 100 will have an initial buoyancy and part 100 and frame 102 will have an initial weight that will be detected by scale 110. Preferably, balance 110 is tared at time zero so that the weight measured thereafter represents the change in apparent weight of part 100. As impregnant fills the voids in part 100, the buoyancy of part 100 decreases and the apparent weight of part 100 measured by balance 110 increases. The change in weight of part 100, the rate of change in weight of part 100, or both, may be measured and used to determine when the desired level of impregnation is achieved.

Figure 2:
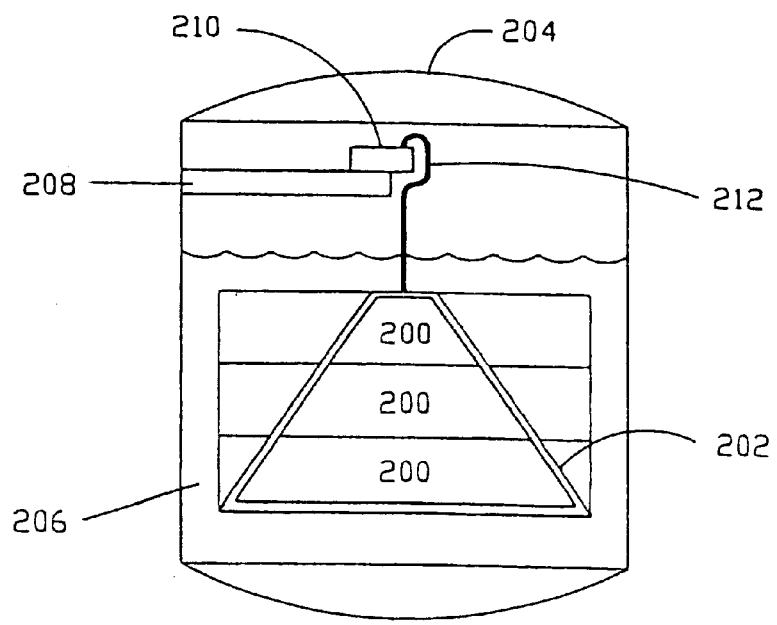
FIG. 2 is a schematic illustration of a preferred embodiment of the present apparatus.

FIG. 2 is a schematic illustration of a preferred embodiment of the present apparatus. Porous parts 200 are supported by frame 202, which is suspended in vessel 204 containing impregnant 206. Cantilever arm 208 is fixed at one end to the inner surface of vessel 204 and the other end extends into the interior volume thereof. Load cell 210 is attached to one end of cantilever arm 208. Hook 212 of frame 202 rests on load cell 210. In a preferred embodiment of the present method, porous parts 200 are suspended in frame 202 by hook 212 and immersed in impregnant 206. At this point (time zero) porous parts 200 will have an initial buoyancy and parts 200 and frame 102 will have an initial weight. Load cell 210 will measure a force corresponding to this initial weight. As impregnant fills the voids in parts 200, their buoyancy decreases and their apparent weight increases, increasing the force exerted on load cell 210. The change in weight of parts 200, the rate of change in weight of parts 200, or both, may be measured and used to determine when the desired level of impregnation is achieved.

The desired level of impregnation of the porous parts may depend on the application. For example, where the porous parts are expanded graphite fuel cell plates preferably at least 85% of the void volume should be filled with impregnant, more preferably at least 95%. The amount of variation from the desired level of impregnation may vary with the particular application, and may depend on the specification tolerance of the impregnated product. For example, it may be desirable to select the desired level of impregnation of expanded graphite fuel cell plates at 90%, within ±5%.

The desired level of impregnation may be determined from the change in buoyancy of the parts, as determined by their change in weight in the impregnant. Porous parts of a known volume and density will have voids of a given total volume. By calculating the volume of impregnant in the part(s), based on the density of the impregnant, it is possible to calculate the percentage of void volume of the part that is filled. Alternatively, the change in weight of the part(s) over time can be plotted. The rate of change in weight at a given time may be indicative of the proportion of total void volume filled with impregnant. As a further alternative, the rate of change in weight may be plotted with test pieces and the resulting graph may be used to determine the change in weight corresponding to a desired level of impregnation.

The impregnation can be performed at atmospheric pressure, if desired, or at a lower or higher pressure. For example, it may be desirable to impregnate the part(s) under reduced pressure in order to remove air entrained in the impregnant and/or the porous parts. Alternatively, it may be desirable to impregnate at super-atmospheric pressure in order to force the impregnant into the pores of the part(s) being impregnated. As a further example, impregnation may be initiated at a reduced pressure to remove excess air, and then the pressure may be increased to super-atmospheric pressure in order to assist penetration of the impregnant into the porous part(s).

Any suitable liquid impregnant may be employed in the present method and apparatus. The choice of impregnant will be determined by such factors as compatibility with the porous part and desired characteristics of the impregnant and of the impregnated part. Suitable impregnants for expanded graphite fuel cell plates, for example, are preferably stable, curable and capable of substantially filling the voids in the plate. Known resins suitable for such purposes include phenols, epoxies, melamines, furans, and acrylics such as methacrylates, for example. The choice of impregnant is not essential to the present method and apparatus, and the appropriate impregnant for a given application may be determined by those skilled in the art.

Any suitable load measuring device may be used in the present method and apparatus. For example, the load cell illustrated in FIG. 2 may be a bending beam, shear beam, canister, ring-and-pancake, or button-and-washer load cell. Other load measuring devices will be known to those skilled in the art.

Preferably, the load measuring device generates an output signal representative of the measured change in weight of the porous part(s) during impregnation. The present apparatus may further comprise a controller for receiving the output signals from the load measuring device. The controller may also display the measured change and/or rate of change in weight. The controller could be programmed to interrupt the impregnation process in response to the measured parameter(s). For example, the controller could interrupt impregnation when the change in weight of the porous parts exceeded a predetermined threshold value, or differed from a threshold value by a predetermined amount. Alternatively, the controller could interrupt the process when the rate of change in weight of the porous part(s) falls below a given threshold amount. As a further example, the controller may interrupt the process when either of the foregoing conditions is met.

In batch processes where a large number of porous parts are impregnated at the same time it may not be desirable to measure the change in weight of the entire batch. If desired, the change in weight of a portion of the porous parts to be impregnated may be measured. Referring to FIG. 2, for example, parts 200 may be a representative sample of a larger batch of such parts. Assuming that the parts chosen as a sample are representative of the entire batch, the change in buoyancy of the sample should reflect the corresponding change in the batch as a whole. Thus, a desired level of impregnation of the batch may be achieved by measuring the change in buoyancy of a portion thereof.

Expanded graphite sheet is hygroscopic, absorbing water from the atmosphere at room temperature. The absorbed water occupies a portion of the void volume of the material that otherwise might be occupied by impregnant. Further, water trapped in the impregnated material may expand and vaporize during curing, which may cause impregnant to bleed out of the plate and be deposited onto the plate's surface, ultimately resulting in undesirable impregnant deposits left on the surface of the impregnated plate.

Similarly, other porous parts may be hygroscopic. Thus, the present method may further comprise the step of baking the porous parts prior to impregnation. The duration and temperature of the baking step will depend upon such factors as the nature of the porous part and the desired level of dryness. For example, expanded graphite sheet separator plates may be baked at a temperature in the range of about 100° C. to about 300° C. (at 1 bara) for about 5 minutes to an hour or more, as desired. Of course, temperatures lower than 100° C. may be employed if baking is performed at pressures below 1 bara, provided the water in the plates vaporizes at the selected temperature and pressure. Persons skilled in the art may readily determine appropriate baking conditions for other applications. The baked porous parts may then be transferred to an impregnation vessel for impregnation.

After impregnation the parts may be washed and rinsed to remove excess impregnant before curing. If the impregnant is water soluble, the impregnated parts may be washed and rinsed in water. For impregnants that are not water soluble, a suitable solvent (which should be miscible in water) may be employed, or a mixture of water and surfactant may be employed, if desired.

However, washing and rinsing also removes some impregnant from the pores near the surface of the part. Thus, extended washing periods may remove too much impregnant. The extent of the washing process is of particular importance with thin impregnated parts where the surface-to-volume ratio is relatively high.

Hot water curing of the washed and rinsed impregnated parts may not be suitable in some instances. For example, in the impregnation process disclosed in commonly assigned U.S. patent application Ser. No. 09/286,144, which is hereby incorporated by reference herein in its entirety, curing of the impregnated parts is performed at pressures greater than atmospheric and may also be performed in a substantially oxygen-free atmosphere.

In such instances it may not be desirable to cure impregnated parts, such as fuel cell components, immediately after washing and rinsing. It has been found that curing plates after washing and rinsing tends to produce undesirable impregnant deposits on their surfaces. Without being bound by theory, it is assumed that such deposits are caused by residual water remaining on the surface of the plate after washing and rinsing that tends to collect at the surface features of the plates, such as fluid flow channels, sealing features, or alignment features, for example. The residual water contains a certain amount of impregnant that on curing of the plate may form a surface deposit that can adversely affect the characteristics of the plate, as mentioned previously. For example, such surface deposits may partially or completely block flow channels on the plate, which could have a detrimental impact on the flow of fuel cell reactants or coolant and, thus, the performance of the fuel cell.

In another aspect, the present process provides for drying impregnated parts and, specifically, impregnated separator plates that are used in fuel cells, prior to curing of the parts.

It has been determined that drying the impregnated part prior to curing results in the part being substantially free of impregnant deposits caused by impregnant in residual water present on the surface of the part after the washing and rinsing steps. This result is surprising, as one might reasonably expect the impregnant to form deposits after evaporation of the water from the plate during drying.

Suitable temperatures for drying the impregnated parts will depend on the particular application. For example, it has been determined that for impregnated fuel cell separator plates, lower drying temperatures may be more convenient than higher temperatures. Where the drying step is performed at higher temperatures, impregnant that has not yet cured can thermally expand. This may cause some of the impregnant to bleed out of the plate and be deposited onto the plate's surface, ultimately resulting in impregnant deposits left on the surface of the impregnated plate upon curing. Further, at higher temperatures, impregnant evaporation can occur. This means that the impregnant or impregnant components evaporate out of the impregnated plate, which results in a loss of impregnant, primarily from the surface of the plate. This, in turn, can adversely impact the structural strength, and particularly the surface hardness, of the plate.

In the present context, whether a given drying temperature is relatively high or low is primarily dependent upon the particular impregnant used in the impregnation of the part. As used herein and in the appended claims, "low temperature" means a temperature below which significant bleed out or evaporation of impregnant occurs, and "high temperature" means a temperature at or above which significant bleed out or evaporation of impregnant occurs.

For example, for methacrylate-impregnated separator plates, the drying step may be performed at temperatures in the range of about 20° C. to about 40° C. Drying times may be reduced in such circumstances where the drying temperature is in the range of about 30° C. to about 40° C. Appropriate drying temperature ranges for other parts and/or impregnants can readily be determined by those skilled in the art.

A drying chamber may be employed in the present process for drying the washed and rinsed impregnated parts. If desired, the drying chamber may be connected to a closed-loop drying system, such as the system commercially available from Hygrex Spehr Industries (Bolton, Ontario, Canada). A closed-loop drying system is basically a dry air generator. It circulates very low humidity dry air into the drying chamber to assist in removing residual water from the surface of the part(s). This may allow for faster drying times, particularly when low drying temperatures are employed.

The following examples are for purposes of illustration and are not intended to limit the invention.

EXAMPLE 1

Expanded graphite sheet fuel cell plates were impregnated in an impregnation vessel according to the present method. The plates were made from embossed GRAFOIL having a sub-80 mesh graphite flake particle size and an area weight of 70 mg/cm$^2$. The plates were baked in an oven for 30 min at 175° C. and a relative humidity of 30%. The baked plates were then transferred to an impregnation vessel.

The impregnation vessel was a S-24×30-AUB (Imprex, Milwaukee, Wis., USA) unit modified by the addition of a cantilever arm, load cell and a metal frame suspended therefrom, as described in FIG. 2 and supporting text, above, and contained methacrylate resin. The load cell (45 N shear beam) was connected to a Goerz Servogor 124 chart recorder via a variable gain and offset instrumentation amplifier for recording the voltage output of the load cell in response to the load exerted on it by the frame and plates during the impregnation process. Ten (10) plates were placed on the frame in the impregnation vessel.

Figure 3:
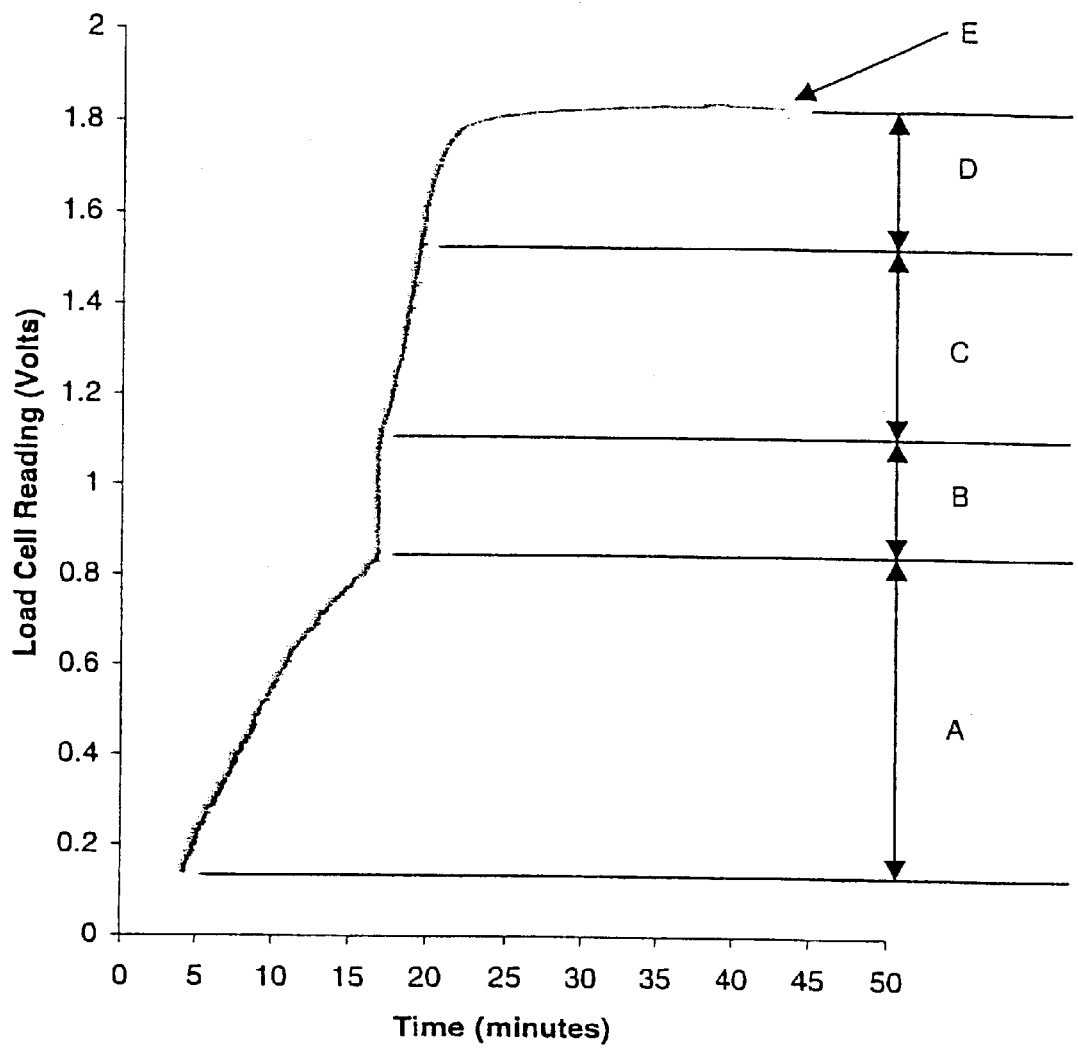
FIG. 3 is a graph of the load cell voltage as a function of time during impregnation of expanded graphite plates (of one grade) according to the present method and apparatus.

FIG. 3 is a graph of the load cell voltage as a function of time during impregnation. The impregnation vessel was sealed and the pressure inside the impregnation vessel was decreased from ambient to 0.3 kPa for 15 minutes to remove entrained air from the plates and resin (part A of FIG. 3). The vacuum was released (part B of FIG. 3), and then the pressure inside the impregnation vessel was increased from ambient to 620 kPa (part C of FIG. 3). The plates were allowed to soak at that pressure (part D of FIG. 3) until the chart recording indicated that the resin had filled about 98–99% of the void volume of the plates (point E of FIG. 3), i.e., when the curve substantially flattened. The impregnation process was interrupted at this time and the plates were removed from the vessel. The total elapsed time was 40 minutes.

The impregnated plates were washed in an agitated water bath for 1 min and then rinsed under the same conditions. The washed and rinsed plates were then placed in a drying chamber connected to a Hygrex closed-loop drying system, and dried for 40 min at 35° C.

EXAMPLE 2

The same procedure was followed as described in Example 1, except that six (6) plates were impregnated and the plates were made of GRAFOIL having an 80 mesh graphite flake particle size, and area weight of 70 mg/cm$^2$, and ceramic fibers imbedded therein. The total elapsed time of the impregnation process was 30.5 minutes.

Figure 4:
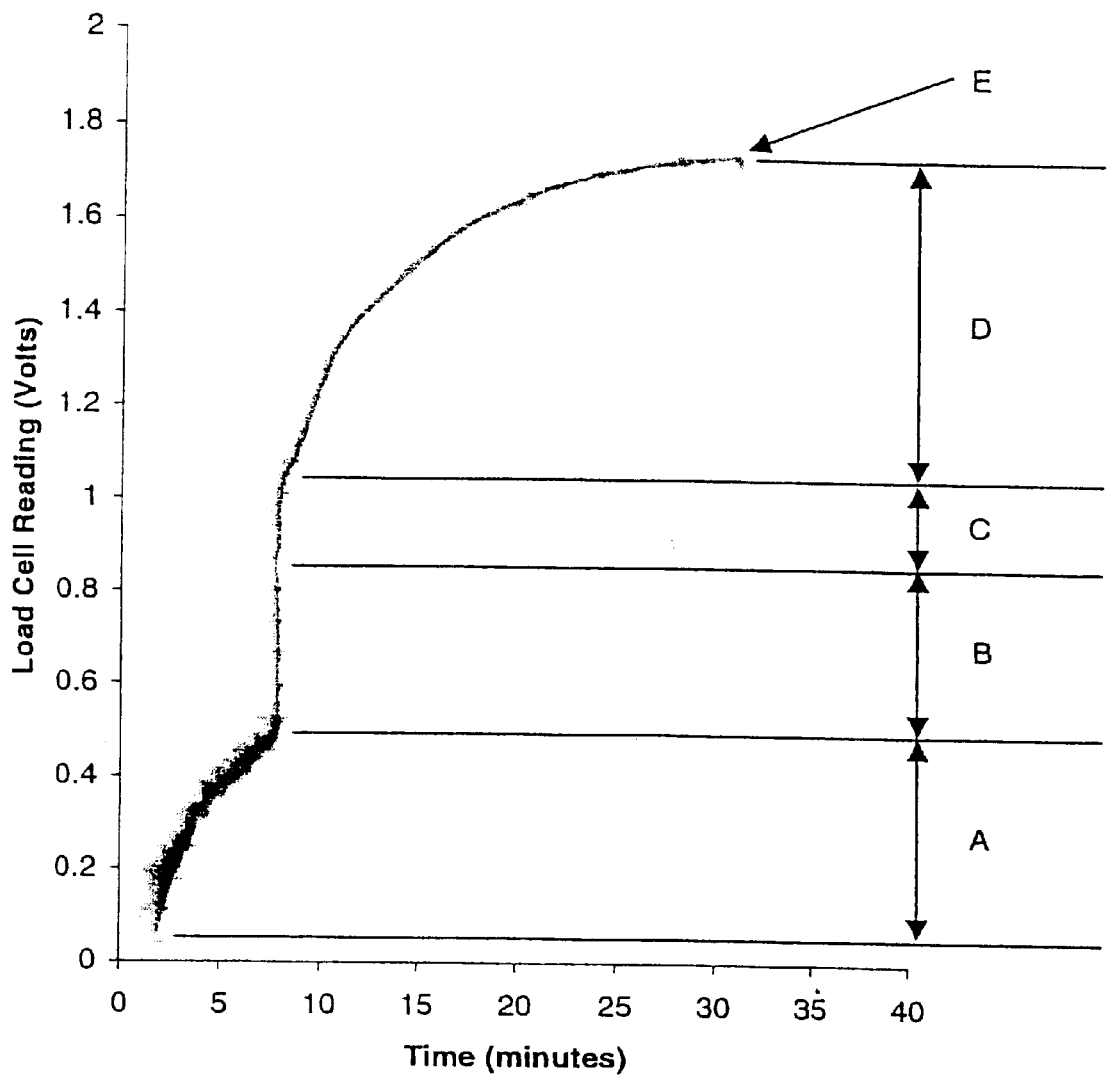
FIG. 4 is a graph of the load cell voltage as a function of time during impregnation of expanded graphite plates (of another grade) according to the present method and apparatus.

FIG. 4 is a graph of the load cell voltage as a function of time during impregnation. The designations used in FIG. 4 for the parts of the graph corresponding to the steps in the process are the same as those used in FIG. 3.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. A process for impregnating a porous part with an impregnant, the process comprising:
    (a) immersing the porous part in the impregnant;
    (b) measuring at least one parameter indicative of the buoyancy of the part as the impregnant impregnates the part; and
    (c) interrupting impregnation when the at least one measured parameter indicates a predetermined level of impregnation is achieved.

2. The process of claim 1 wherein the at least one measured parameter comprises the change in weight of the porous part.

3. The process of claim 2 wherein in step (c), impregnation is interrupted when the change in weight exceeds a predetermined threshold value.

4. The process of claim 1 wherein the at least one measured parameter comprises the rate of change in weight of the porous part.

5. The process of claim 4 wherein in step (c), impregnation is interrupted when the rate of change in weight falls below a predetermined threshold value.

6. The process of claim 1 wherein the at least one measured parameter comprises the change in weight of the porous part and the rate of change in weight thereof.

7. The process of claim 6 wherein in step (c), impregnation is interrupted when the change in weight exceeds a predetermined threshold value.

8. The process of claim 6 wherein in step (c), impregnation is interrupted when the rate of change in weight falls below a predetermined threshold value.

9. The process of claim 1 wherein step (c) further comprises comparing the measured parameter to a reference parameter value.

10. The process of claim 9 wherein the impregnation is interrupted when the measured parameter varies from the reference parameter value by less than a predetermined threshold amount.

11. The process of claim 1 wherein the at least one measured parameter is measured continuously.

12. The process of claim 1, further comprising sending an output signal representative of the at least one measured parameter to a controller.

13. The process of claim 12 wherein the controller comprises a display for displaying the at least one measured parameter represented by the output signal.

14. The process of claim 13 wherein the impregnation is interrupted in response to an output signal from the controller.

15. The process of claim 1 wherein the porous part comprises a carbon plate.

16. The process of claim 15 wherein the carbon plate is a graphite plate.

17. The process of claim 16 wherein the graphite plate is an expanded graphite plate.

18. The process of claim 17 wherein the impregnant comprises a resin, the resin selected from the group consisting of phenols, epoxies, melamines, furans and acrylics.

19. The process of claim 1 wherein the porous part is impregnated at a pressure less than atmospheric pressure.

20. The process of claim 1 wherein the porous part is impregnated at a pressure greater than atmospheric pressure.

21. The process of claim 1 wherein the impregnation is interrupted when the measured parameter indicates that at least 85% of the void volume of the part is impregnated.

22. The process of claim 1 wherein the impregnation is interrupted when the measured parameter indicates that at least 95% of the void volume of the part is impregnated.

23. The process of claim 1 wherein the porous part is a plurality of porous parts and wherein the measured parameter is indicative of the level of impregnation of the plurality of porous parts.

24. The process of claim 1 wherein the porous part is a portion of a plurality of porous parts, and step (b) comprises measuring at least one parameter indicative of the level of impregnation of the portion of the plurality of porous parts as the impregnant impregnates the plurality of parts.

25. The process of claim 24 wherein the at least one measured parameter comprises the change in weight of the portion of the plurality of porous parts.

26. The process of claim 24 wherein the at least one measured parameter comprises the rate of change in weight of the portion of the plurality of porous parts.

27. The process of claim 24 wherein the at least one measured parameter comprises the change in weight of the portion of the plurality of porous parts and the rate of change in weight thereof.

28. The process of claim 1 wherein the porous part is hygroscopic, the process further comprising baking the porous part before immersing it in the impregnant.

29. The process of claim 28 wherein the porous part comprises expanded graphite and it is baked at a temperature in the range of about 100° C. to about 300° C.

30. The process of claim 29 wherein the porous part is baked at 175° C. for a period of about 5 minutes to about 1 hour.

31. The process of claim 1, further comprising:
    (d) washing and rinsing the impregnated part; and
    (e) drying the impregnated part at a drying temperature, thereby removing residual water from the surface of the porous part.

32. The process of claim 31 wherein the porous part comprises expanded graphite, the impregnant is a methacrylate resin, and the drying temperature is in the range of about 20° C. to about 40° C.

33. The process of claim 31 wherein the porous part is dried in a drying chamber having a closed-loop drying system.

* * * * *